March 21, 1933.  W. H. ARKENBURGH  1,902,485
ELECTRICAL CONTROL SYSTEM
Filed Nov. 13, 1931

Inventor:
Weber H. Arkenburgh,
by Charles E. Mullen
His Attorney.

Patented Mar. 21, 1933

1,902,485

UNITED STATES PATENT OFFICE

WEBER H. ARKENBURGH, OF SCHENECTADY, NEW YORK, ASSIGNOR TO GENERAL ELECTRIC COMPANY, A CORPORATION OF NEW YORK

ELECTRICAL CONTROL SYSTEM

Application filed November 13, 1931. Serial No. 574,845.

My invention relates to electrical control systems and more particularly to static systems for automatically controlling the division of load between a plurality of parallel connected sources of electrical energy without the use of moving parts.

There are many cases where it is desirable to control and vary the division of load between a plurality of parallel connected sources of current supply. One such case is where reliability and continuity of service are of prime importance. In such a situation, one of two parallel connected sources of current supply may be made to supply all of the load during normal operating conditions while the other source acts as a standby source and is held in readiness to supply the load in case of failure of the first source. An example of such a situation is found in railway signal work where great reliability is demanded.

Another case calling for the automatic division of load between parallel connected sources of current supply is where economy is of primary importance. In such a situation it is often desirable to have one of a plurality of parallel connected sources supply all of the load current up to the capacity, or rating, of this source, whereupon the additional marginal amounts of power required by the load are supplied by another of the parallel connected sources.

In putting my invention into practice I make use of a saturable reactor for controlling the division, or distribution, of load between a plurality of sources in accordance with any one of a number of conditions of the control system.

An object of my invention is to provide a novel and simple static arrangement for automatically controlling the division of load between a plurality of parallel connected electrical circuits.

Another object of my invention is to provide simple static means for automatically causing one of a plurality of parallel connected sources of current supply to supply all of the load connected to both sources up to a predetermined load value, after which the other source, or sources, of current supply act to supply marginal increases in load.

My invention will be better understood from the following description taken in connection with the accompanying drawing and its scope will be pointed out in the appended claims.

Figure 1:
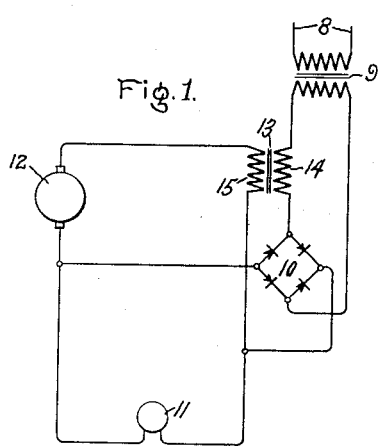
Figure 2:
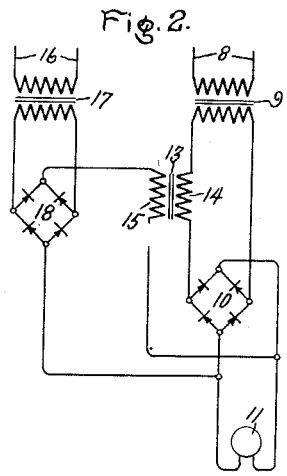

In the drawing, Fig. 1 illustrates diagrammatically an embodiment of my invention, in which the load distribution between direct and alternating current sources of current supply is so controlled that the direct current source supplies all of the load up to a predetermined load value, after which the alternating current source supplies the marginal load, while Fig. 2 illustrates a modification which is similar to Fig. 1 except that both sources of current supply are alternating current sources.

Referring now to Fig. 1 of the accompanying drawing which illustrates diagrammatically an embodiment of my invention in which an alternating current source 8 is connected through a transformer 9 and a rectifier 10 in parallel with a load 11, and a source of direct current 12. It is desired that source 12 will supply all of the current required by load 11 up to a predetermined load value after which source 8 will supply the marginal additional load. In order to do this, I provide a saturable reactor 13 having an alternating current, or variable reactance, winding 14 connected in circuit with the source 8 and a direct current saturating winding 15 connected in circuit with the source 12. Reactor 13 is preferably so operated that over a considerable range in energization of the direct current saturating winding very little change in the reactance of winding 14 takes place. This may be done, for example, by using an especially large reactor, or by using a reactor having an especially large magnetic circuit, or by using a special reactor such as is described and claimed in a copending application Serial No. 574,843, filed November 13, 1931, in the name of August Schmidt, Jr., and assigned to the assignee of the present application.

The operation of the arrangement illustrated in Fig. 1 is as follows: Between zero load and a predetermined value of load current required by load 11, the reactance of the reactor 13 is so high that little or no current is supplied by source 8, and all of the load is supplied by source 12. After the predetermined load value has been exceeded, reactor 13 saturates thereby reducing the reactance of its winding 14 and permitting more and more of the load current to be supplied by the source 8. The point at which source 8 begins to supply some of the load current may be at any point between no load and full rated load of source 12.

The modification shown in Fig. 2 differs from Fig. 1 in that the direct current source 12 of Fig. 1 is replaced by an alternating current source 16 which is connected to load 11 through the direct current saturating winding of reactor 13 by means of a transformer 17 and a rectifier 18. The operation is the same as for Fig. 1 and source 16 may be made to supply practically all of load 11 up to a predetermined value of load which may be any value between no load and full load of source 16. After this point, source 8 will supply the marginal loads required by load 11.

While I have shown and described particular embodiments of my invention, it will be obvious to those skilled in the art that changes and modifications may be made without departing from my invention, and I therefore aim in the appended claims to cover all such changes and modifications as fall within the true spirit and scope of my invention.

What I claim as new and desire to secure by Letters Patent of the United States, is:

1. An electrical system including, in combination, a load, a plurality of sources of current supply connected in parallel to said load, and a saturable reactor having an alternating current winding connected to control the output of one source and a direct current saturating winding connected to be energized in accordance with the output of another source.

2. In combination, a pair of parallel connected supply circuits, one of said circuits containing a source of alternating current and a rectifier, a load connected to said supply circuits, and a saturable reactor having an alternating current winding connected in the supply circuit which includes a source of alternating current and a direct current saturating winding connected in the other supply circuit.

3. In combination, a source of direct current, a source of alternating current connected in parallel therewith through a rectifier, a variable load connected to said sources, and a saturable reactor having an alternating current winding connected to control the output of said source of alternating current and a direct current saturating winding connected to respond to the current supplied by said source of direct current.

4. In combination, a rectifier having alternating current input terminals and direct current output terminals, a source of direct current connected in parallel to said direct current output terminals, and a saturable core reactor having an alternating current winding connected in circuit with said alternating current input terminals and a direct current saturating winding connected in circuit with said source of direct current.

5. In combination, a direct current load, a pair of supply circuits including independent sources of alternating current connected in parallel to said load through rectifiers, and a saturable reactor having a variable reactance winding connected to control the output of one supply circuit and a direct current saturating winding connected to respond to the current in the other supply circuit.

6. In combination, a pair of rectifiers having alternating current input terminals and parallel connected direct current output terminals respectively, independent sources of alternating current connected to said input terminals respectively, and a saturable core reactor having an alternating current winding connected in circuit with the alternating current input terminals of one rectifier and a direct current saturating winding connected in circuit with the direct current output terminals of the other rectifier.

In witness whereof, I have hereto set my hand.

WEBER H. ARKENBURGH.